United States Patent
Brehob et al.

(10) Patent No.: US 7,104,235 B2
(45) Date of Patent: Sep. 12, 2006

(54) STARTING A CAMLESS ENGINE FROM REST

(75) Inventors: Diana D. Brehob, Dearborn, MI (US); Thomas W. Megli, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/978,999

(22) Filed: Nov. 1, 2004

(65) Prior Publication Data

US 2006/0090721 A1    May 4, 2006

(51) Int. Cl.
*F02N 17/00* (2006.01)
*F02N 17/08* (2006.01)
*F02D 13/06* (2006.01)
*F02D 13/02* (2006.01)

(52) U.S. Cl. .................................................. 123/179.5
(58) Field of Classification Search ............. 123/179.2, 123/179.3, 179.4, 179.5
See application file for complete search history.

(56) References Cited

U.S. PATENT DOCUMENTS

| | | | | |
|---|---|---|---|---|
| 4,364,343 A | * | 12/1982 | Malik | 123/179.4 |
| 4,495,924 A | * | 1/1985 | Ueno et al. | 123/478 |
| 6,050,231 A | * | 4/2000 | Tisch et al. | 123/179.1 |
| 6,062,186 A | * | 5/2000 | Barnes et al. | 123/179.3 |
| 6,098,585 A | | 8/2000 | Brehob et al. | |
| 6,718,928 B1 | * | 4/2004 | Brueggen et al. | 123/179.5 |
| 2004/0123831 A1 | | 7/2004 | Grieser et al. | |
| 2005/0211194 A1 | * | 9/2005 | Hanson et al. | 123/179.5 |

FOREIGN PATENT DOCUMENTS

DE    31 17 144 A1  * 11/1982

* cited by examiner

Primary Examiner—Stephen K. Cronin
Assistant Examiner—Arnold Castro
(74) Attorney, Agent, or Firm—Diana D. Brehob

(57) ABSTRACT

A method and system to start an internal combustion engine from rest is disclosed. The engine has intake and exhaust valves in each cylinder in which actuation of such valves is independent of engine rotation. The engine also has a fuel injector and a spark plug disposed in each engine cylinder. The intake and exhaust valves are closed in one engine cylinder; fuel is sprayed into such cylinder; the spark plug is fired in such cylinder. Additionally, a second cylinder is identified in which the intake and exhaust valves are closed, fuel is sprayed, and a spark is fired prior to engine rotation.

11 Claims, 2 Drawing Sheets

V-8 Engine

I-4 Engine 6-cyl Engine

STARTING A CAMLESS ENGINE FROM REST

FIELD OF INVENTION

The present invention relates to an internal combustion engine, which can be ignited from rest. In particular, the internal combustion engine has intake valves, which are actuated independent of engine rotation. Preferably, the engine is one in which the exhaust valves are also actuated independent of engine rotation and one in which fuel injectors are coupled directly to engine cylinders.

BACKGROUND OF THE INVENTION

In U.S. Pat. No. 6,098,585, assigned to the assignee of the present invention, an internal combustion engine, which can be started from rest without benefit of a starter motor, is disclosed. Conventional engines are equipped with camshaft-actuated intake and exhaust valves. The camshaft or camshafts are gear or belt-driven from the engine's crankshaft. Thus, the camshaft position, and consequently the valve open/close status, is coupled to the crankshaft position. An engine at rest, therefore, has some cylinders with one valve open, some cylinders with both valves closed, and possibly one or more cylinders with both valves open. According to '585, a cylinder, or cylinders, with both valves closed and with the piston in the appropriate position, can be supplied fuel and ignited to initiate engine rotation.

The inventors of the present invention have recognized that an engine with intake and/or exhaust valves coupled to engine rotation, as described in '585, may have at best one cylinder in a favorable position for providing the fuel in the spark. The inventors have further recognized that engine in which the actuation of the valves is decoupled from the rotation of the engine allows control over valve position so that more cylinders can be fueled and ignited to initiate engine rotation more robustly.

SUMMARY OF THE INVENTION

A method to start an internal combustion engine from rest is disclosed. The engine has an intake valve in each cylinder in which its actuation is independent of engine rotation. The engine also has a fuel injector and a spark plug disposed in each engine cylinder. The method includes closing the intake valve in one engine cylinder, spraying fuel into the cylinder, and sparking into the cylinder, the sparking being provided by a spark plug disposed in the one engine cylinder. The method includes closing an exhaust valve, which is actuatable independent of engine rotation, prior to said sparking. The method further includes identifying a second cylinder in which the intake and exhaust valves are closed, fuel is sprayed, and a spark is fired. The valve closing, fuel spraying, and sparking occur prior to the engine rotating.

An internal combustion engine having a plurality of cylinders, each of which have at least one intake valve, at least one exhaust valve, and a spark plug disposed within. The intake valve is actuatable independent of engine rotation. The cylinder also has an injector. In one embodiment, the injector is placed in the combustion chamber. In an alternative embodiment, the injector is placed in the intake port outside the combustion chamber. The engine also has an electronic control unit electronically coupled to the intake valves, the fuel injectors, and the spark plugs. The electronic unit provides the following signals to a first cylinder: causing an intake valve to close, causing a fuel injector to open, and causing a spark plug to fire, the spark plug firing following the intake valve closing and the fuel injector opening wherein the engine is at rest when the signals are provided to the intake valve, the fuel injector, and the spark plug.

A method to operate an internal combustion engine having an intake valve, an exhaust valve, a fuel injector, and a spark plug disposed in engine cylinders is disclosed. The actuation of the intake and exhaust valves is independent of engine rotation. The engine has a typical order for firing of the cylinders during normal operation. The method includes starting the engine from rest by combusting in at least two engine cylinders substantially simultaneously. Upon an immediately prior engine shutdown, a first of the two engine cylinders underwent an intake stroke later than a second of the two engine cylinders. Further, combustion is caused to occur in a next cylinder, which next cylinder is an engine cylinder next scheduled to fire after the first of two engine cylinders according to the typical order for firing of the cylinders.

The method further includes subsequently opening and closing the exhaust valve in the second cylinder during the upward travel of the piston in the second cylinder and opening and closing the intake valve during a first half of a next piston downward movement in the second cylinder with the closing occurring after opening. Fuel is supplied to the second cylinder during the next piston downward movement in the second cylinder. The spark plug in the second cylinder is fired after the closing of the intake valve.

A method to operate an internal combustion engine having at least eight cylinders is disclosed. The engine intake and exhaust valves disposed in each engine cylinder are actuatable independent of engine rotation. The engine also has a fuel injector and a spark plug disposed in each engine cylinder, the engine further having a typical order for firing of the cylinders The engine is started from rest by combusting in four engine cylinders substantially simultaneously. Pistons in a first and second of the four engine cylinders are closer to bottom dead center than positions of pistons in third and fourth cylinders; and the third cylinder underwent an intake stroke later than the fourth cylinder. Combustion is caused to occur in a next cylinder, the next cylinder being an engine cylinder next scheduled to fire after the third according to the typical order for firing of the cylinders.

BRIEF DESCRIPTION OF THE DRAWINGS

The advantages described herein will be more fully understood by reading an example of an embodiment in which the invention is used to advantage, referred to herein as the Detailed Description, with reference to the drawings wherein.

DETAILED DESCRIPTION

Figure 1:
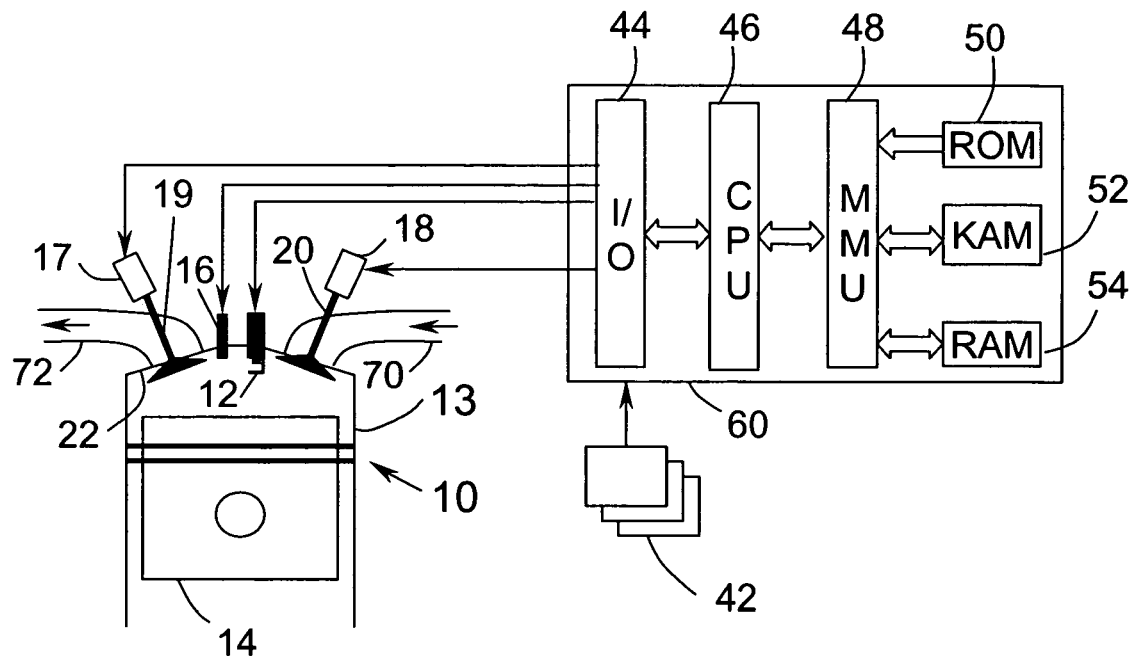
FIG. 1 is a schematic of an engine equipped with electromechanically-actuated poppet valves.

In FIG. 1, a single cylinder 13 of an internal combustion engine 10 with an electromechanical intake valve 20 and exhaust valve 19 is shown. Engine 10 contains a piston 14, which reciprocates within cylinder 13. Intake valve 20, disposed in cylinder head 22, is opened to allow gases to communicate between the combustion chamber (the volume enclosed by cylinder 13, piston 14, and cylinder head 22) and intake port 70. When exhaust valve 19 is opened, gases are released from the combustion chamber into exhaust port 72. In the embodiment shown in FIG. 1, fuel is injected into the combustion chamber by injector 16, a configuration commonly called direct fuel injection. However, the present invention may also apply to port fuel injection, in which the fuel injector sprays fuel into intake port 70. Intake valve 20 and exhaust valve 19 are actuated electromechanically by valve actuators 18 and 17, respectively. Alternatively, valve actuators 17 and 18 are electrohydraulic, piezoelectric, or any other type of actuator, which allows operation of the valves independent of engine 10 rotation. In a preferred embodiment, engine 10 is a spark-ignited engine, spark plug 12 initiates combustion in the combustion chamber. The present invention also applies to engines with other types of igniters.

Valve actuators 17 and 18 as shown in FIG. 1 are electromechanical actuators. In an alternate embodiment, intake valve 19 is actuated by an electromechanical valve actuator 17 and exhaust valve 20 is actuated by a conventional camshaft. Such an arrangement is less preferred for practicing the present invention due to the lack of flexibility in actuating exhaust valve 20, which will be discussed below.

Continuing to refer to FIG. 1, electronic control unit (ECU) 60 is provided to control engine 10. ECU 60 has a microprocessor 46, called a central processing unit (CPU), in communication with memory management unit (MMU) 48. MMU 48 controls the movement of data among the various computer readable storage media and communicates data to and from CPU 46. The computer readable storage media preferably include volatile and nonvolatile storage in read-only memory (ROM) 50, random-access memory (RAM) 54, and keep-alive memory (KAM) 52, for example. KAM 52 may be used to store various operating variables while CPU 46 is powered down. The computer-readable storage media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by CPU 46 in controlling the engine or vehicle into which the engine is mounted. The computer-readable storage media may also include floppy disks, CD-ROMs, hard disks, and the like. CPU 46 communicates with various sensors and actuators via an input/output (I/O) interface 44. Examples of items that are actuated under control by CPU 46, through I/O interface 44, are fuel injection timing, fuel injection rate, fuel injection duration, throttle valve position, spark plug 12 timing, actuation of valve actuators 18 and 17 to control opening and closing of intake valve 20 and exhaust valve 19, respectively, and others. Sensors 42 communicating input through I/O interface 44 may be indicating piston position, engine rotational speed, vehicle speed, coolant temperature, intake manifold pressure, pedal position, throttle valve position, air temperature, exhaust temperature, exhaust stoichiometry, exhaust component concentration, and air flow. Some ECU 60 architectures do not contain MMU 48. If no MMU 48 is employed, CPU 46 manages data and connects directly to ROM 50, RAM 54, and KAM 52. Of course, the present invention could utilize more than one CPU 46 to provide engine control and ECU 60 may contain multiple ROM 50, RAM 54, and KAM 52 coupled to MMU 48 or CPU 46 depending upon the particular application.

Figure 2:
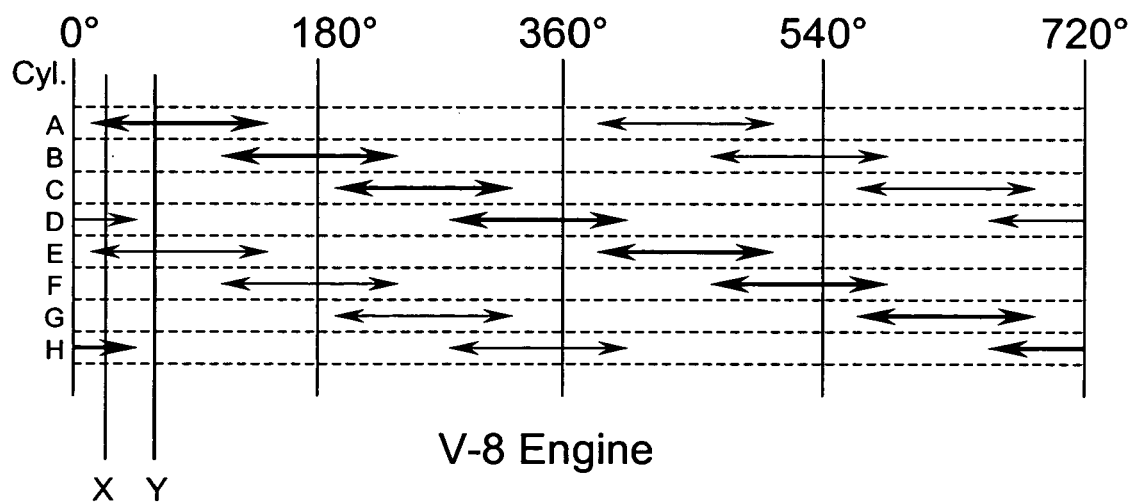
FIG. 2 is a crank angle position diagram for a V-8 engine showing favorable positions for starting in the 8 cylinders.

Referring to FIG. 2, crank angle position diagram of an 8-cylinder engine is shown. In a 4-stroke engine, any given cylinder undergoes the processes of intake, compression, expansion, and exhaust within 720 degrees, or 2 revolutions of the engine. Within that 720 degrees, one of the cylinders' spark plug fires every 90 degrees of rotation. In FIG. 2, the 8 cylinders are shown as cylinders A, B, C, D, E, F, G, and H. The cylinders are purposely not give numerical indexes, because FIG. 2 shows the cylinder firings happening in order. In practice, the cylinders do not fire in numerical order, but in an order to provide the least amount of unbalance, and which is consistent with the crankshaft design. Following cylinder A, during the first 180 degrees, the piston in the cylinder is in an expansion stroke, i.e., piston moving from a top dead center position toward a bottom dead center position. The piston moves upward during 180–360°. The piston in cylinder A moves downward during 360–540°; and, upward during 540–720°. The arrows in the 0–180° and 360–540° portions, for cylinder A, indicate favorable positions for igniting fuel and air in the cylinder, with the engine at rest. If the piston were in the 180–360° or 540–720° range and ignition occurred, combustion pressure would push the piston downward, causing the engine to rotate in the opposite direction of its normal direction. As many components, including the driveline and oil pumps are expecting engine rotation only in one direction, it is undesirable to allow rotation in a direction opposite to the standard direction. The arrows do not encompass the entire 0–180° interval. If the piston is too close to top dead center, there is a minimum of air above the piston. The ensuing combustion may not sufficiently push the piston down to rotate the engine far enough for starting. Thus, the piston should be at a position after top dead center by an amount, which can be determined experimentally. Also, the piston should not be at a position too close to bottom dead center. The combustion pressure acts on the piston to move it downward. When the piston reaches bottom dead center, it begins to travel upward and the combustion pressure would act to push against the piston in the wrong direction.

Continuing to refer to FIG. 2, cylinder B is the next piston to fire after cylinder A. Thus, the processes described above in regards to cylinder A are displaced by 90°. Thus, at 180°, when the piston in cylinder A is at bottom dead center, the cylinder B is right in a favorable position for self-starting. The events in cylinder C are displaced 180° from cylinder A; cylinder D is displaced 270° and so forth.

Continuing with FIG. 2, the two favorable positions for starting in cylinder A occur in the 0 –180° and in the 360–540° windows, which are the normal downward piston strokes. If engine 10 has both intake valves 20 and exhaust valves 19, in which their operation is fully decoupled from engine rotation, the two starting positions are equally advantageous. If, however, engine 10 has electromechanically actuated intake valves 20 and conventional camshaft-actuated exhaust valves 19, only one of the two favorable positions for starting can be used. In the 0 –180° range, cylinder A is undergoing an expansion stroke. Intake valve 20 is capable of being placed in a closed position by action of actuator 17 and exhaust valve 19 is in a closed position because cylinder A is in an expansion stroke. As discussed above, 180 –360° and 540 –720° ranges are unfavorable because they would cause the engine to rotate in the wrong direction. During 360 –540°, cylinder A is undergoing an intake stroke. Because intake valve 20 has completely flexible events, the intake valves are capable of being closed. Exhaust valve 19 is in a closed position. However, exhaust valve 19, which is camshaft-actuated, remains closed until the next exhaust stroke, which is about 360° later. Thus, if combustion were to occur in cylinder A in the 360–540° interval, the force of combustion pressure acts on the piston in cylinder A downwardly, causing the engine to rotate. But, during the succeeding 540–720° interval, the combustion pressure acts to stop engine 10 from rotating; the expansion work of cylinder E will not be large enough to overcome the compression work required to maintain rotation. Thus, in an engine with camshaft-actuated exhaust valves, only the bold arrows of FIG. 2 are favorable positions in the various cylinders for starting engine 10. All of the arrows of FIG. 2 indicate favorable positions in the various cylinders for starting engine 10 for engine in which both intake valves 20 and exhaust valves 19 are actuated independent of engine rotation (fully variable valvetrain).

The length of the arrows in FIG. 2 are intended for illustrative purposes only and are not intended to be limiting to the present invention.

Consider two cases where the engine is at rest at position X or Y. An arbitrary position X is shown in FIG. 2. The line at position X intersects 4 arrows, in cylinders A, D, E, and H. Thus, in an engine with a fully variable valvetrain, all of cylinders A, D, E, and H can be caused to control intake and exhaust valves, provided with fuel, and provided with ignition. The ensuing combustion in these 4 cylinders causes the engine to rotate, thereby compressing air in other cylinders and allowing engine combustion to occur in those other cylinders. If the arbitrary Y is considered, only two cylinders, A and E, have favorable positions intersecting with Y. In this situation, there are two cylinders to be used for starting engine 10. Inspection of all positions in FIG. 2 indicates that there are 2 favorable cylinders available for ignition at the least and 4 at the most. If engine 10 has camshaft-actuated exhaust valves 19, the number of cylinders available for self-starting is either 1 or 2, depending on the arbitrary position at which engine 10 stopped.

Figure 3:
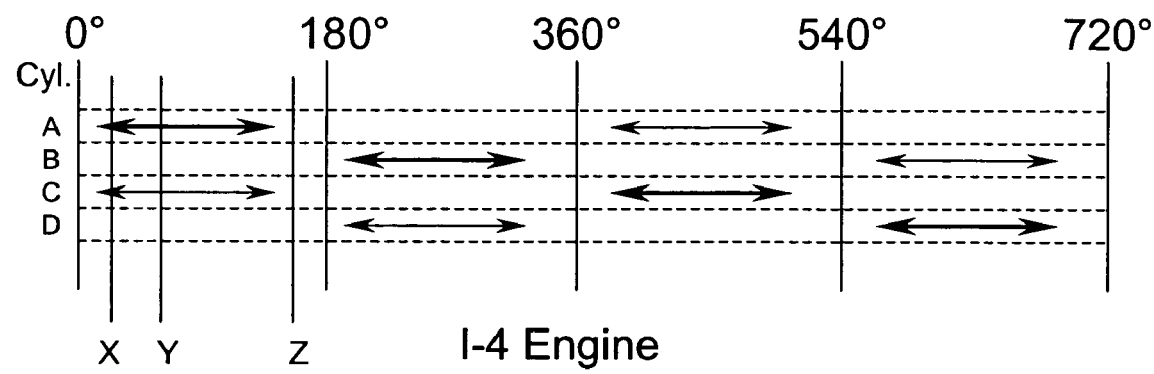
FIG. 3 is a crank angle position diagram for an I-4 engine showing favorable positions for starting in the 4 cylinders.

A crank angle position diagram for a 4-cylinder engine is shown in FIG. 3. In the 720°, during which all 4 cylinders have a combustion event, a cylinder fires every 180°. At arbitrary positions X and Y, cylinders A and C are both in a favorable position for ignition. At arbitrary position Z, no cylinders are in a favorable position for ignition. Thus, if engine 10 were to stop in a position corresponding to position Z in the cycle, it would be impossible to start engine 10 from such position. However, there are measures that can be taken to ensure that the engine stops in a favorable position for restarting, such as shown in published application U.S. 2004-0123831, assigned to the assignee of the present invention.

Figure 4:
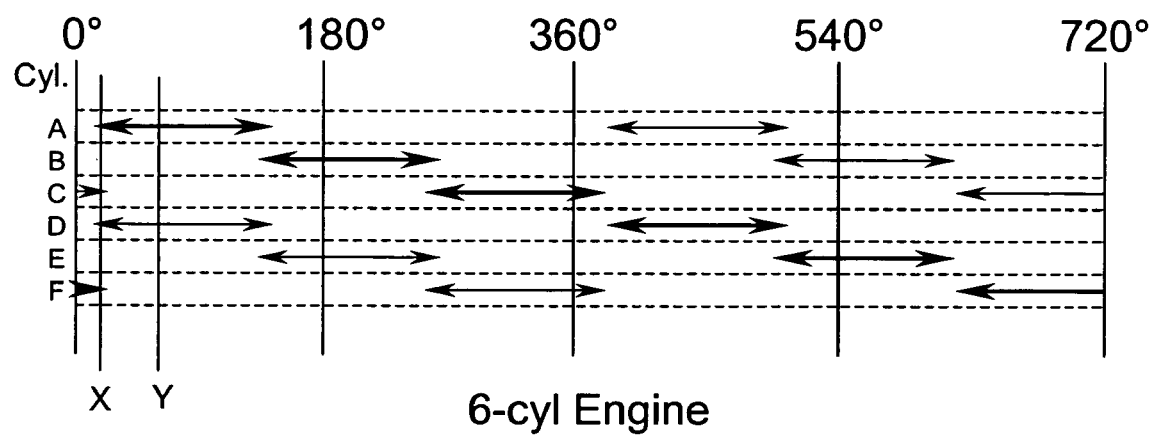
FIG. 4 is a crank angle position for a 6-cylinder engine showing favorable positions for starting in the 6 cylinders.

A crank angle position diagram for a 6-cylinder engine, is shown in FIG. 4, in which a cylinder fires every 120°. At position X, cylinders A, C, D, and F are in favorable positions for starting. However, the existence of 4 cylinders to start the engine depends on the length of the arrows, i.e., the exact period for favorable starting. As discussed above, the exact period can be determined experimentally and depends on variables such as engine friction in the engine, engine architecture, etc. At position Y, cylinders A and D are in a favorable position. Depending on the length of the favorable positions for starting, it is possible that there would be a position, such as position Z in FIG. 3, in which no cylinders are in a favorable position. As discussed above, measures could be taken to ensure that the engine does not stop in such a position. Also, as discussed above, if the engine has camshaft-actuated exhaust valves, half as many cylinders would be available, at any given position, for favorable starting than with an engine with a fully variable valvetrain.

Six-cylinder engines are built in inline-6, 60° vees, and 90° vees commonly. All of these engines have firing of the cylinders occurring every 120°; thus, FIG. 4 applies to all these configurations. The cylinder designations A–F do not indicate the cylinder firing order, which order depends on the engine configuration.

As shown in FIG. 1, fuel injector 16 is mounted in the combustion chamber. Alternatively, fuel injector 16 is mounted in intake port 70. In this case, fuel is injected prior to intake valve 20 being caused to close. A portion of the fuel injected by injector 16 diffuses into the combustion chamber past intake valve 20. Additionally, the fuel may drip from intake port walls into the combustion chamber. Furthermore, if there are temperature gradients, convective currents may be set up causing fuel to be carried into the combustion chamber. After a period of time elapses, i.e., a period of time to ensure that a sufficient amount of fuel has been transported into the combustion chamber, intake valve 20 is closed and combustion is initiated afterward.

The illustration of a single cylinder of engine 10 in FIG. 1 shows one intake valve and one exhaust valve. It is common to have two or more intake valves and two or more exhaust valves per cylinder. For the present invention, all intake valves and all exhaust valves are closed prior to initiating combustion in the cylinder. Otherwise, an open valve would allow the combustion-generated pressure to escape through the valve.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

We claim:

1. A method to start an internal combustion engine from rest, the engine having an intake valve disposed in engine cylinders, actuation of the intake valve being independent of engine rotation, the engine also having a fuel injector and a spark plug disposed in each engine cylinder, comprising;

closing the valve in one engine cylinder;

spraying fuel into said one cylinder, said fuel being provided by the fuel injector disposed in said one engine cylinder; and sparking into said one engine cylinder, said sparking being provided by the spark plug in said one engine cylinder wherein the engine is at rest during said closing, spraying, and sparking and an exhaust valve, at least one being disposed in each of the engine cylinders, is actuated by a camshaft, said camshaft coupled to and driven by the engine, and said one engine cylinder is an engine cylinder in which the exhaust valve is closed.

2. The method of claim 1 wherein the engine has a normal direction of rotation and said one engine cylinder has a piston disposed in the cylinder, said piston is in such a position that if said piston were caused to move downward that the engine rotates in said normal direction.

3. An internal combustion engine, comprising:

a plurality of cylinders, each of said cylinders having at least one intake valve, at least one exhaust valve, and a spark plug disposed therein, said intake valve being actuatable independent of engine rotation, said cylinder also having an injector;

an electronic control unit electronically coupled to said intake valves, said fuel injectors, and said spark plugs, said electronic unit providing the following signals: causing an intake valve in a first cylinder to close, causing a fuel injector in said first cylinder to open, and causing a spark plug in said first cylinder to fire, said spark plug firing following said intake valve closing and said fuel injector opening wherein said engine is at rest when said signals are provided to said intake valve, said fuel injector, and said spark plug and an exhaust valve, at least one being disposed in each of the engine cylinders, is actuated by a camshaft, said camshaft coupled to and driven by the engine, and said one engine cylinder is an engine cylinder in which the exhaust valve is closed.

4. The engine of claim 3 wherein said fuel injectors spray fuel directly into said cylinders.

5. A computer readable storage medium having stored data representing instructions executable by a computer, the computer being adapted to be coupled to an internal combustion engine, the engine having an intake valve disposed in engine cylinders, actuation of the intake valve being independent of engine rotation, the engine also having a fuel injector and a spark plug disposed in each engine cylinder, comprising:

instructions to close the intake valve in a first cylinder wherein an exhaust valve, at least one being disposed in each of the engine cylinders, is actuated by a camshaft, said camshaft coupled to and driven by the engine, and said one engine cylinder is an engine cylinder in which the exhaust valve is closed; instructions to actuate the fuel injector in said first cylinder, said actuation following said closing; and instructions to fire the spark plug in said first cylinder, said firing following said actuation of the fuel injector wherein said closing of the intake valve, actuating the fuel injector and firing the spark plug are performed while the engine is not rotating.

6. The medium of claim 5 wherein the engine has a normal rotation direction and said first cylinder has a piston disposed therein, said piston is at a position such that when said piston moves downward, the engine rotates in said normal direction.

7. The medium of claim 5, wherein the medium comprises a computer chip.

8. A method to operate an internal combustion engine, the engine having an intake valve and an exhaust valve disposed in engine cylinders, actuation of the intake and exhaust valves being independent of engine rotation, the engine also having a fuel injector and a spark plug disposed in each engine cylinder, the engine further having a typical order for firing of the cylinders, the method comprising;

starting the engine from rest by combusting in at least two engine cylinders substantially simultaneously wherein upon an immediately prior engine shutdown, a first of said two engine cylinders underwent an intake stroke later than a second of said two engine cylinders;

causing combustion to occur in a next cylinder wherein said next cylinder is an engine cylinder next scheduled to fire after said first of two engine cylinders according to the typical order for firing of the cylinders.

9. The method of claim 8, further comprising: opening said exhaust valve in said second cylinder within 20 crank degrees of a first time the piston in said second cylinder attains a bottom dead center position and subsequently closing said exhaust valve in said second cylinder within 20 crank degrees of a first time the piston in said second cylinder attains a top dead center position.

10. The method of claim 8, further comprising:

opening and closing the intake valve during a first half of a next piston downward movement in said second cylinder, said closing occurring after said opening;

supplying fuel to said second cylinder during said next piston downward movement in said second cylinder; and firing the spark plug in said second cylinder after said closing of the intake valve.

11. A method to operate an internal combustion engine, the engine having at least eight cylinders and an intake valve and an exhaust valve disposed in each engine cylinder, actuation of the intake and exhaust valves being independent of engine rotation, the engine also having a fuel injector and a spark plug disposed in each engine cylinder, the engine further having a typical order for firing of the cylinders, the method comprising;

starting the engine from rest by combusting in four engine cylinders substantially simultaneously wherein pistons in a first and second of said four engine cylinders are closer to bottom dead center than a position of pistons in a third and a fourth of said four engine cylinders and said third cylinder underwent an intake stroke later than said fourth cylinder during an immediately prior engine shutdown; and causing combustion to occur in a next cylinder wherein said next cylinder is an engine cylinder next scheduled to fire after said third of said four engine cylinders according to the typical order for firing of the cylinders.

* * * * *